United States Patent
Nicholas et al.

(10) Patent No.: US 9,422,987 B2
(45) Date of Patent: Aug. 23, 2016

(54) UNIVERSAL JOINT WITH PROTECTIVE SHIELD

(71) Applicant: Ford Global Technologies, LLC, Dearborn, MI (US)

(72) Inventors: Christopher Peter Nicholas, Milford, MI (US); Jonathan Gretsky, Trenton, MI (US); Scott Wilson, Lexington, MI (US); Anthony Paskus, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 14/565,722

(22) Filed: Dec. 10, 2014

(65) Prior Publication Data
US 2016/0169294 A1    Jun. 16, 2016

(51) Int. Cl.
*F16D 3/84* (2006.01)
*F16D 3/223* (2011.01)

(52) U.S. Cl.
CPC .............. *F16D 3/845* (2013.01); *F16D 3/223* (2013.01); *Y10S 464/906* (2013.01)

(58) Field of Classification Search
CPC ...... F16D 3/223; F16D 3/845; Y10S 464/906
USPC .................. 464/173–175, 906; 277/634–636; 74/609
See application file for complete search history.

(56) References Cited

U.S. PATENT DOCUMENTS

| 1,967,842 A | * | 7/1934 | Raviola ................. F16D 3/2052 464/173 X |
|---|---|---|---|
| 3,842,621 A | | 10/1974 | Mazziotti |
| 7,097,568 B2 | * | 8/2006 | Kuczera .................. F16D 3/845 277/634 |
| 7,997,988 B2 | | 8/2011 | Wormsbaccher et al. |
| 8,136,816 B1 | * | 3/2012 | Lou ......................... F16D 3/845 277/634 X |
| 2003/0144060 A1 | | 7/2003 | Fuchs et al. |

FOREIGN PATENT DOCUMENTS

| GB | 815869 | * | 7/1959 | .................... 464/175 |
|---|---|---|---|---|
| JP | 2010105473 A | | 5/2010 | |
| WO | 2008126791 A1 | | 10/2008 | |

* cited by examiner

*Primary Examiner* — Gregory Binda
(74) *Attorney, Agent, or Firm* — James Dottavio; Brooks Kushman P.C.

(57) ABSTRACT

A constant velocity (CV) joint includes a shield to protect a J-boot from damage due to projectiles such as stones and to prevent ballooning. A rigid portion of the shield is fixed to a ring, which is adapted for fixation to a powertrain component such as a transmission. A flexible portion of the shield prevents projectiles from entering through the opening created by non-coincident axes of the shaft and ring. The flexible portion has a number of truncated conical panels with alternating orientation that accommodate the variable size opening by flexing in an accordion-like fashion.

15 Claims, 6 Drawing Sheets

UNIVERSAL JOINT WITH PROTECTIVE SHIELD

TECHNICAL FIELD

This disclosure relates to the field of vehicle drivelines. More particularly, the disclosure pertains to a constant velocity universal joint having a protective shield.

BACKGROUND

FIG. 1 schematically illustrates a rear wheel drive vehicle powertrain with an independent rear suspension. Solid lines indicate shafts capable of transferring torque and power. Engine 10 converts chemical energy in the fuel into mechanical power. Transmission 12 modifies the speed and torque to suit current vehicle requirements. At low vehicle speed, the transmission provides torque multiplication for improved performance. At cruising vehicle speed, the transmission increases speed permitting the engine to run at a fuel efficient operating point. The output of transmission 12 is coupled to the input of differential 14 by rear driveshaft 16. Two components are coupled when rotating either component by one revolution causes the other component to rotate by one revolution. Differential 14 distributes the power to left rear wheel 18 and right rear wheel 20 via left axle shaft 22 and right axle shaft 24 respectively. Differential 14 changes the direction of rotation by 90 degrees and multiplies the torque by a final drive ratio. Differential 14 provides approximately equal torque to each wheel while permitting slight speed differences as the vehicle turns a corner.

In a four wheel drive vehicle based on the powertrain of FIG. 1, a transfer case fixed to the transmission divides power between the rear driveshaft 16 and a front driveshaft that directs power to the front wheels via a front differential. In a front wheel drive powertrain, the front differential is typically integrated with the transmission in an assembly called a transaxle. In a four wheel drive vehicle based on a front wheel drive powertrain, a power take-off unit fixed to the transaxle drives a rear driveshaft and a rear drive unit fixed to the rear differential selectively transfers power to the rear differential. Throughout this document, the term transmission should be interpreted to include any transfer case or power take-off unit. Similarly, the term differential should be interpreted to include any rear drive unit.

Engine 10, transmission 12, and rear differential 14 are mounted to vehicle structure. Wheels 18 and 20 are supported via a suspension that allows the wheels to move vertically over road bumps while limiting the vertical movement of the vehicle body. The axis of rotation of engine 10 and transmission 12 may be offset slightly from the input axis of differential 14. Universal joints 26 and 28 accommodate this offset by transmitting torque and power between shafts that rotate about intersecting but not coincident axes. Similarly, universal joints 30, 32, 34, and 36 accommodate the offset between the output axis of differential 14 and the axes of rotation of wheels 18 and 20 even though the axes of rotation of the wheels fluctuates as the wheels absorb road bumps. In some rear wheel drive vehicles, the differential 14 is not mounted directly to the vehicle frame but is instead supported by left and right axles 22 and 24. This eliminates the need for universal joints 30 and 34 but universal joints 26 and 28 must then accommodate a fluctuating offset between the transmission output axis and the differential input axis.

A variety of types of universal joints are known. In the simplest types of universal joint, although the driving shaft and driven shaft are coupled, the instantaneous speed of the driven shaft differs slightly from the instantaneous speed of the driving shaft as a function of rotational position. Consequently, although the driving shaft may have a constant speed, the driven shaft speed may oscillate at a frequency proportional to the driving shaft speed. Due to the inertia associated with the driven shaft, this results in an oscillating torque level. The oscillating torque level may be perceived by vehicle occupants, especially if the frequency is close to a natural frequency of the driveline. Therefore, universal joints that maintain equal instantaneous speeds between the driving and driven shafts, called Constant Velocity (CV) joints, are desirable. Several types of CV joint mechanisms are known. Among known CV joint types, tripod joints and Rzeppa joints are common in automotive drivelines.

SUMMARY OF THE DISCLOSURE

A constant velocity joint includes a ring, a shaft, a flexible boot, and a protective shield. The ring is adapted for fixation to a flange of a powertrain component such as a transmission. The ring and the shaft are coupled to rotate at the same rotational speed, but their axes are not constrained to be coincident. The flexible boot seals a cavity containing lubricating fluid. The protective shield includes a rigid portion and a flexible portion. The rigid portion, which is fixed to the ring, extends axially over the boot to protect the boot from projectiles and to prevent ballooning. An outer edge of the flexible portion is fixed to the ring while an inner edge of the flexible portion maintains contact with the shaft, preventing projectiles from reaching the flexible boot around the rigid portion. The flexible portion may define a plurality of truncated conical panels with alternating orientation such that the flexible portion deflects accordion fashion to accommodate the non-coincident axes of the ring and shaft. Both the rigid portion and the flexible portion of the protective shield may be formed in multiple circumferential segments for ease of assembly.

A vehicle driveshaft includes a shaft, a ring, a flexible boot, a rigid shield, and a flexible shield. The shaft is adapted for fixation to a differential at one end and is coupled to the ring at the opposite end. The shaft and the ring have non-coincident axes. A flexible boot is fixed to the ring and to the shaft. The rigid shield fixed to the ring extends axially over the flexible boot to protect the boot from projectiles and to prevent ballooning. An outer edge of the flexible shield is fixed to the rigid shield while an inner edge of the flexible shield contacts the shaft. The flexible portion may define a plurality of truncated conical panels with alternating orientation such that the flexible portion deflects accordion fashion to accommodate the non-coincident axes of the ring and shaft. Both the rigid portion and the flexible portion of the protective shield may be formed in multiple circumferential segments for ease of assembly.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
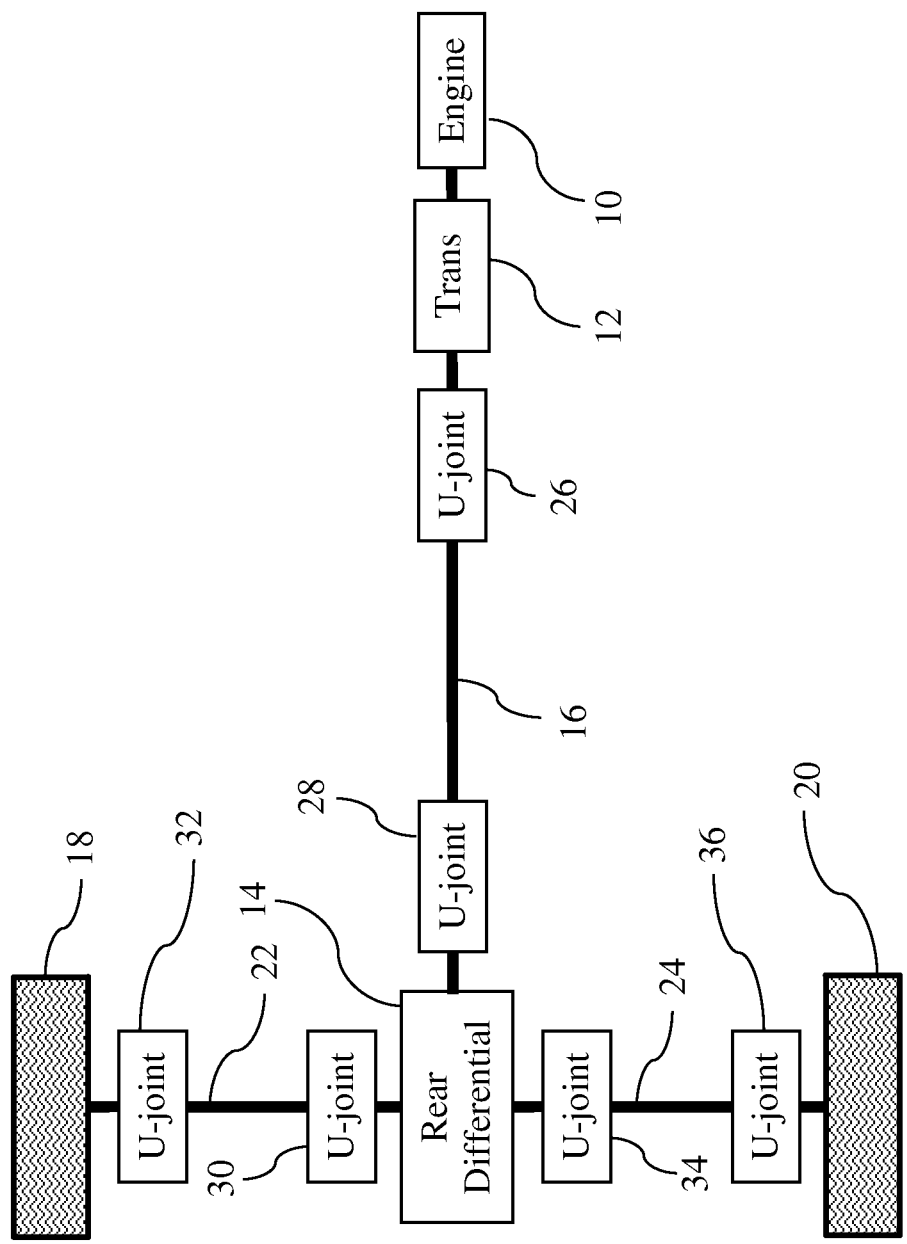
FIG. 1 is a schematic diagram of a vehicle powertrain.
Figure 2:
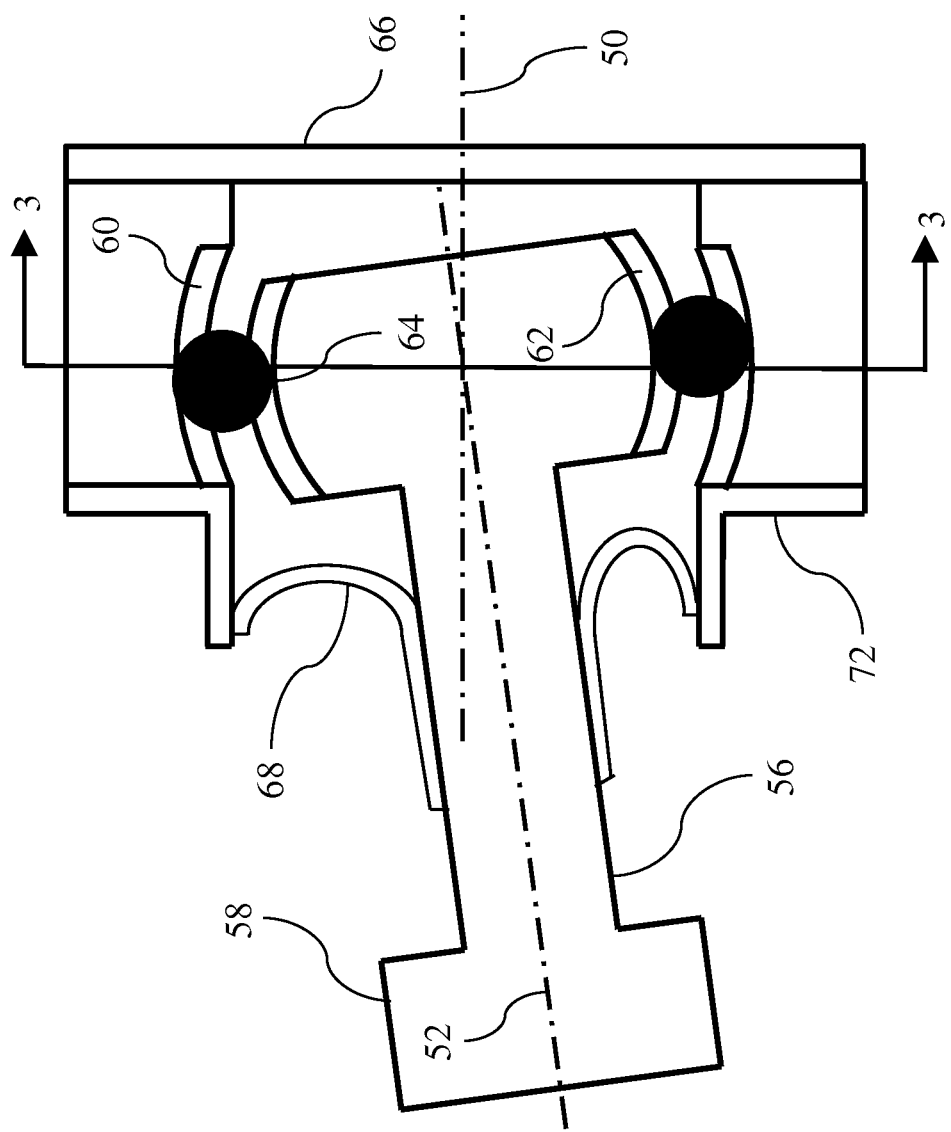
FIG. 2 is side cross section of a CV joint suitable for use in several locations in the powertrain of FIG. 1.
Figure 3:
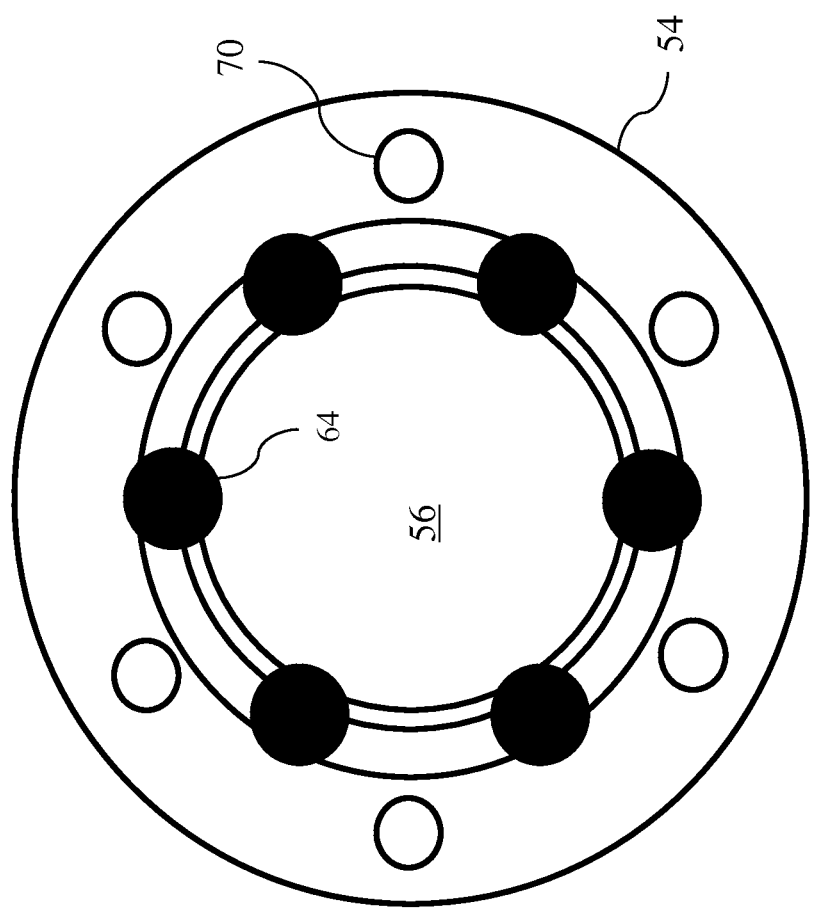
FIG. 3 is an end cross section of the CV joint of FIG. 2.
Figure 4:
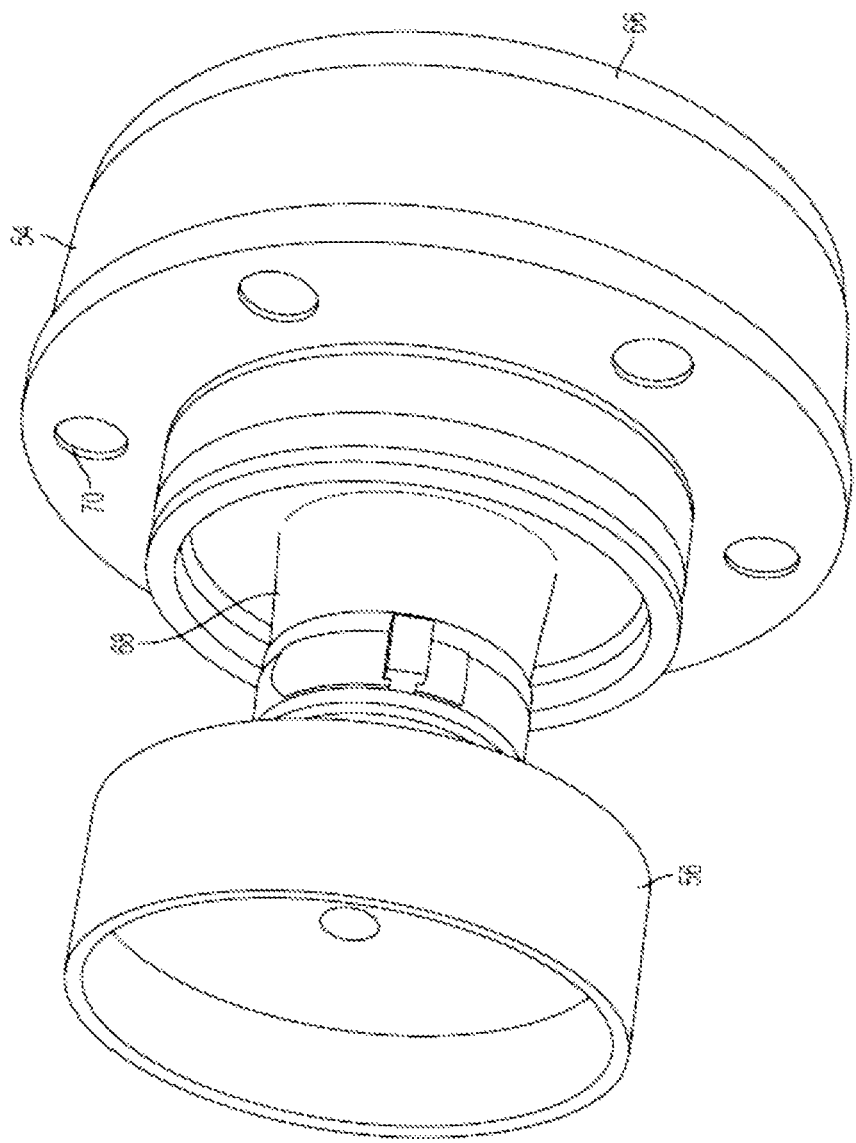
FIG. 4 is a pictorial view of the CV joint of FIG. 2.

FIGS. 2-4 illustrate a Rzeppa-type CV joint suitable for use at 26, 28, 30, 32, 34, and/or 36 in FIG. 1. FIG. 2 is a cross section in the plane defined by the centerlines 50 and 52 of the two sides of the joint. Ring 54 is adapted for fixation to the driveline component such as the transmission output shaft, the wheel, or the differential as described in detail below. Stub shaft 56 is adapted for fixation to driveshaft 16 or to an axle shaft 22 or 24. Stub shaft 56 may be fixed to the shaft by welding at the circumference of flange 58, for example. Six concave grooves 60 are formed in ring 54 and six convex grooves 62 are formed in stub shaft 56. Six balls 64, each positioned within a concave groove 60 and a convex groove 62, position stub shaft radially with respect to ring 54. The balls can roll within the grooves to accommodate the angle between axis 50 and axis 52. For example, as shown in FIG. 2, the ball at the top has rolled toward the left of the groove in ring 54 and has rolled toward the right end of the groove in stub shaft 56. The ball on the bottom has rolled the opposite direction. As either the ring or the stub shaft rotates about its respective axis, the balls force the other member to rotate by an equal amount such that the grooves line up at the ball locations. The balls may be retained by a cage (not shown).

Proper function of the joint requires lubrication, typically in the form of grease. A back plate 66 and a flexible boot 68 seal a cavity to retain the grease and to prevent contaminants from entering. Flexible boot 68 may be a J-shaped boot fixed to front plate 72 which, in turn, is fixed to ring 54. Boot 68 is made of a flexible material to accommodate the different axes of rotation. During each revolution of the shafts, a particular circumferential portion of the boot changes from the shape shown at the top of FIG. 2 to the shape shown at the bottom of FIG. 2 and then back. In some applications, such as the underside of an off-road vehicle, the joint may be vulnerable to projectiles that may puncture the J-boot. If the grease leaks out or contaminants get in, friction may lead to rapid temperature increase and joint failure.

Another failure mode, called ballooning, occurs when the pressure builds up inside the grease cavity. This may occur, for example, due to friction causing the temperature of the grease and air in the cavity to increase. Centrifugal forces also contribute to internal pressure in the cavity. The increased pressure may cause boot 68 to deform such that the convex surface facing the grease cavity becomes concave. This type of deflection weakens the boot material over time, eventually leading to loss of sealing function and eventual joint failure.

FIG. 3 is a cross section taken through the plane defined by the six balls 64. FIG. 4 is a pictorial view of the joint. Ring 54 defines six holes 70 that are used to fix the ring to the component, such as the transmission, differential, or wheel. Specifically, six bolts are inserted through the holes 70, from the side with the J-boot, into threaded holes in a flange of the component. Washers may be inserted to distribute the compressive force from the bolt head across the face of the front plate 72. In some cases, it may be necessary to rotate the shaft after inserting some of the bolts in order to be able to reach the remaining bolts with an appropriate tool. The shaft may be welded to the stub shaft 54 prior to positioning the shaft assembly into the vehicle.

Figure 5:
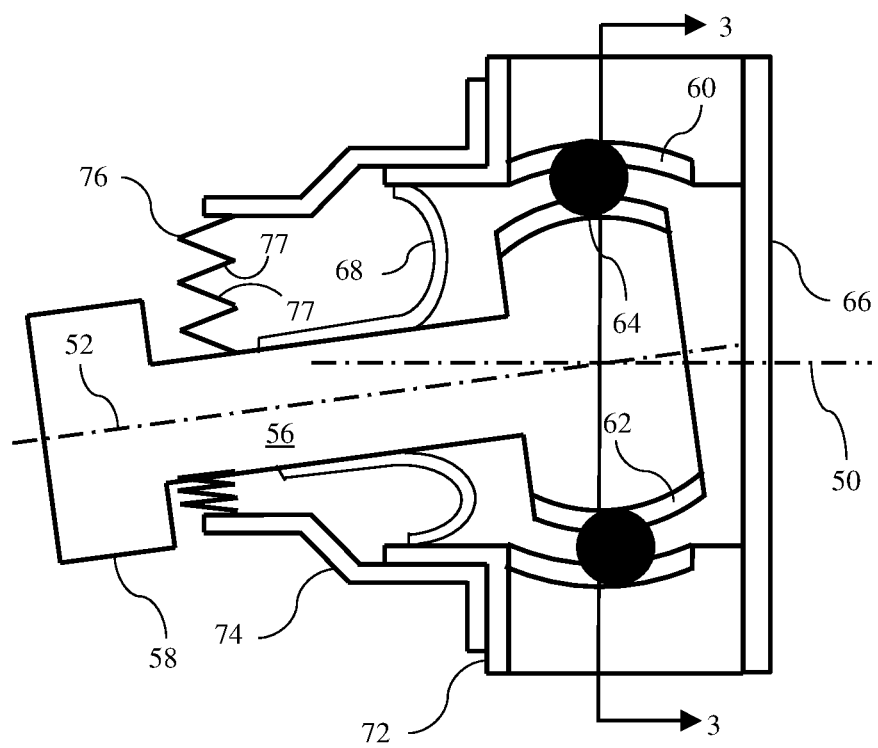
FIG. 5 is a side cross section of the CV joint of FIG. 2 with a protective shield.
Figure 6:
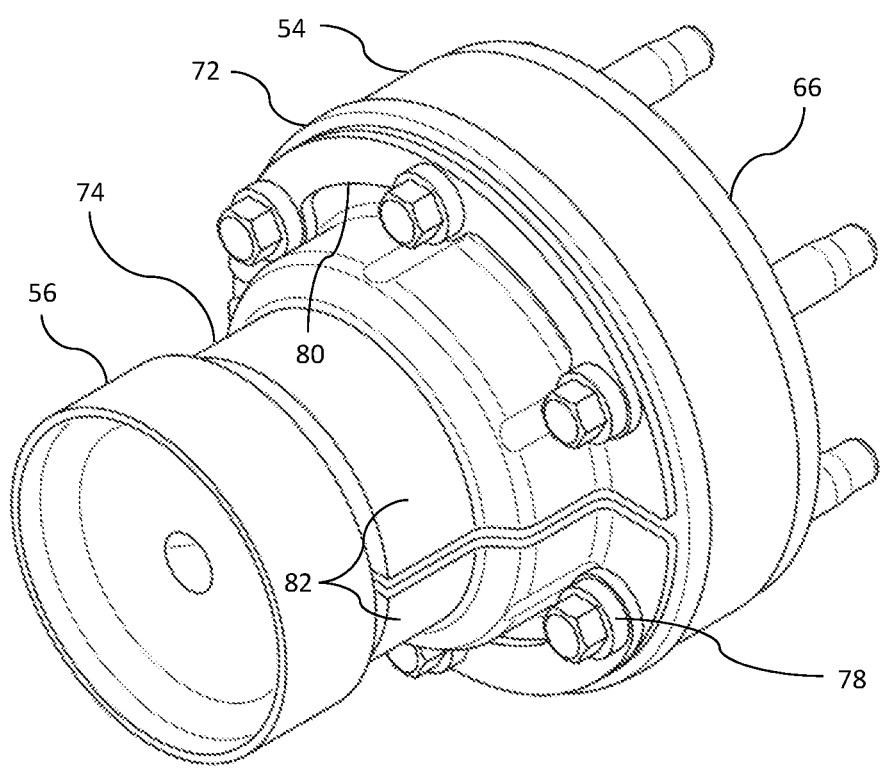
FIG. 6 is a pictorial view of the CV joint of FIG. 2 with a protective shield.

FIGS. 5 and 6 show the CV joint of FIGS. 2-4 with a protective shield. FIG. 5 is a cross section in the same plane as FIG. 2. The protective shield includes a rigid portion 74 and a flexible portion 76. The rigid portion 74 is fixed to the ring. For example, the rigid portion may be fixed to the ring by the same bolts 78 that fix the ring to the driveline component. A flange of the rigid portion may be compressed between the washer 80 and the front plate. The rigid portion 74 also constrains boot 68 from ballooning outward. The rigid portion protects the flexible J-boot from damage. The flexible portion seals off the gap between the rigid portion and the shaft, preventing any projectiles from reaching the J-boot and potentially rupturing it. In order to accommodate the non-coincident axes of rotation, an inner edge of the flexible portion must be capable of moving to a position not concentric with an outer edge. This may be accomplished, for example, by forming the flexible portion with an accordion shape having a number of truncated conical panels 77 with alternating orientation. Unlike the flexible J-boot, however, the flexible portion of the protective shield does not need to form a seal against the shaft. If a projectile, such as a rock, creates a small hole in the flexible portion, the universal joint will continue to function properly.

FIG. 6 is a pictorial view of the CV joint with protective shield 74 and 76. FIG. 6 also shows the six bolts 78 and the washers 80 used to fasten ring 54 to a component flange. Note that both the rigid portion 74 and the flexible portion 76 of the shield may be formed from multiple circumferential segments 82 which collectively surround the circumference of the J-boot. Each circumferential portion can be fastened to the CV joint separately.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:
1. A universal joint comprising:
a ring having a ring axis;
a shaft coupled to the ring and having a shaft axis non-coincident with the ring axis;
a flexible boot fixed to the ring and to the shaft;
a rigid shield fixed to the ring and extending axially over the flexible boot; and a flexible shield fixed at an outer edge to the rigid shield and contacting the shaft at an inner edge.

2. The universal joint of claim 1 wherein the rigid shield comprises multiple circumferential segments.

3. The universal joint of claim 1 wherein the flexible shield defines a plurality of truncated conical panels having alternating orientation.

4. The universal joint of claim 1 wherein the flexible shield comprises multiple circumferential segments.

5. The universal joint of claim 4 wherein each circumferential segment defines a plurality of truncated conical panels having alternating orientation.

6. The universal joint of claim 1 wherein an instantaneous rotational speed of the ring with respect to the ring axis is constrained to be equal to an instantaneous rotational speed of the shaft with respect to the shaft axis at all rotational positions of the shaft.

7. The universal joint of claim 6 further comprising:
six balls each configured to roll within a respective convex groove in the shaft and within a respective concave groove in the ring.

8. A vehicle driveshaft comprising:
a shaft having a shaft axis and adapted for fixation at a first end to a differential;
a ring adapted for fixation to a transmission and coupled to a second end of the shaft to rotate about a ring axis non-coincident with the shaft axis;
a flexible boot fixed to the ring and to the shaft;
a rigid shield fixed to the ring and extending axially over the flexible boot; and
a flexible shield fixed at an outer edge to the rigid shield and contacting the shaft at an inner edge of the flexible shield.

9. The driveshaft of claim 8 wherein the rigid shield comprises multiple circumferential segments.

10. The driveshaft of claim 8 wherein the flexible shield defines a plurality of truncated conical panels having alternating orientation.

11. The driveshaft of claim 8 wherein the flexible shield comprises multiple circumferential segments.

12. The driveshaft of claim 11 wherein each circumferential segment defines a plurality of truncated conical panels having alternating orientation.

13. A constant velocity joint comprising:
a ring having a ring axis and adapted for fixation to a flange of a powertrain component;
a shaft having a shaft axis not constrained to be coincident with the ring axis, the shaft coupled to the ring such that a rotational speed of the shaft and a rotational speed of the ring are constrained to be equal;
a flexible boot fixed to the ring and to the shaft to seal a cavity containing a lubricating fluid; and
a protective shield having a rigid portion fixed to the ring and extending axially over the flexible boot and having a flexible portion fixed at an outer edge to the rigid portion and contacting the shaft at an inner edge of the flexible portion.

14. The constant velocity joint of claim 13 wherein the protective shield comprises at least two circumferential segments each fixed to the ring by bolts and a washer.

15. The constant velocity joint of claim 13 wherein the flexible portion defines a plurality of truncated conical panels having alternating orientation.

\* \* \* \* \*